United States Patent
Welle et al.

(10) Patent No.: US 12,232,445 B2
(45) Date of Patent: Feb. 25, 2025

(54) HARVESTING HEADER HAVING A HYDRAULIC FLUID LOOP AND RELATED SYSTEMS AND METHODS

(71) Applicant: AGCO Corporation, Duluth, GA (US)

(72) Inventors: Benjamin Adam Welle, Hesston, KS (US); Randall Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 814 days.

(21) Appl. No.: 17/424,556

(22) PCT Filed: Jan. 8, 2020

(86) PCT No.: PCT/IB2020/050118
§ 371 (c)(1),
(2) Date: Jul. 21, 2021

(87) PCT Pub. No.: WO2020/165661
PCT Pub. Date: Aug. 20, 2020

(65) Prior Publication Data
US 2022/0095538 A1    Mar. 31, 2022

Related U.S. Application Data

(60) Provisional application No. 62/803,895, filed on Feb. 11, 2019.

(51) Int. Cl.
*A01D 41/14*        (2006.01)
*A01B 63/00*        (2006.01)
(Continued)

(52) U.S. Cl.
CPC ........... *A01D 41/142* (2013.01); *A01D 41/06* (2013.01); *A01D 69/03* (2013.01); *A01B 63/004* (2013.01)

(58) Field of Classification Search
CPC .............. A01D 41/1274; A01D 41/141; A01D 41/142; A01D 69/03; F15B 11/161; F15B 11/165
See application file for complete search history.

(56) References Cited

U.S. PATENT DOCUMENTS 4,009,556 A    3/1977  Molzahn
5,791,128 A    8/1998  Rogalsky
(Continued)

FOREIGN PATENT DOCUMENTS

CN    104696297    *  6/2015
DE    37 08 550 A1    9/1987
(Continued)

OTHER PUBLICATIONS

European Patent Office, International Search Report for related International Application No. PCT/IB2020/050118, mail date Apr. 7, 2020.
(Continued)

*Primary Examiner* — Adam J Behrens
*Assistant Examiner* — Ashley A Kaercher

(57) ABSTRACT

A harvesting header includes a header frame structured to be coupled to the crop-harvesting machine, a hydraulic pump carried by the header frame, at least one tool carried by the header frame, a hydraulic fluid loop carried by the header frame, a fluid inlet structured to receive hydraulic fluid from the crop-harvesting machine, and a fluid outlet structured to deliver hydraulic fluid to the crop-harvesting machine. The hydraulic fluid loop is structured to circulate hydraulic fluid within the header from the hydraulic pump to the tool(s) and back to the hydraulic pump. Related methods of operating a harvesting header and a non-transitory computer-readable media are also disclosed.

19 Claims, 5 Drawing Sheets

(51) Int. Cl.
      *A01D 41/06*       (2006.01)
      *A01D 69/03*       (2006.01)

(56) References Cited

U.S. PATENT DOCUMENTS

| | | |
|---|---|---|
| 6,116,006 A | 9/2000 | Killen et al. |
| 2008/0104937 A1* | 5/2008 | Enns .................... A01D 41/142 |
| | | 56/168 |
| 2012/0011821 A1 | 1/2012 | Olander et al. |
| 2015/0237799 A1 | 8/2015 | Trowbridge |
| 2015/0291028 A1 | 10/2015 | Heindl |
| 2017/0071131 A1 | 3/2017 | Joyce |
| 2019/0003496 A1 | 1/2019 | Hunt et al. |

FOREIGN PATENT DOCUMENTS

| | | | | |
|---|---|---|---|---|
| DE | 3708550 | * | 9/1987 | |
| DE | 10 2017 201701 A1 | | 8/2018 | |
| EP | 0131368 | * | 1/1985 | |
| EP | 1795765 A2 | * | 6/2007 | ............. A01D 69/03 |
| EP | 2910101 A1 | * | 8/2015 | ........... A01D 41/142 |
| EP | 3103319 A1 | * | 12/2016 | ............. A01D 41/12 |
| WO | WO-2018224135 A1 | * | 12/2018 | ............. E01C 19/28 |

OTHER PUBLICATIONS

UK Intellectual Property Office, Search Report for related UK Application No. GB1915398.0, dated Apr. 17, 2020.
European Property Office, Search report for related EP Application No. 20701884.7, dated 05 AGO 2024, 5 pages.

* cited by examiner

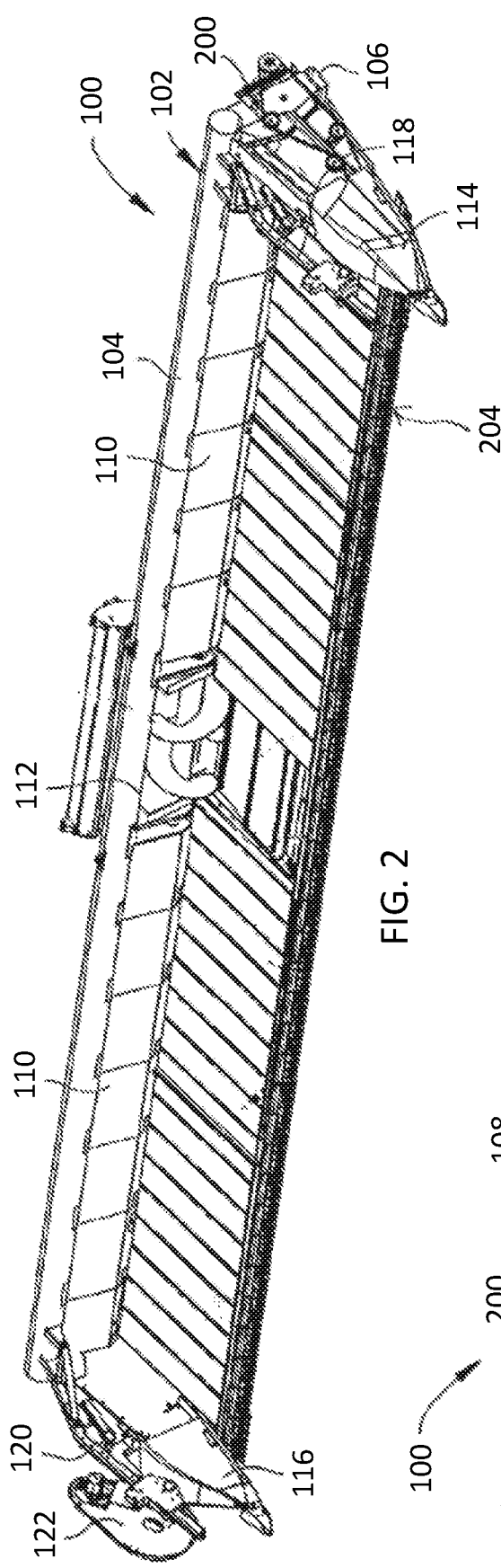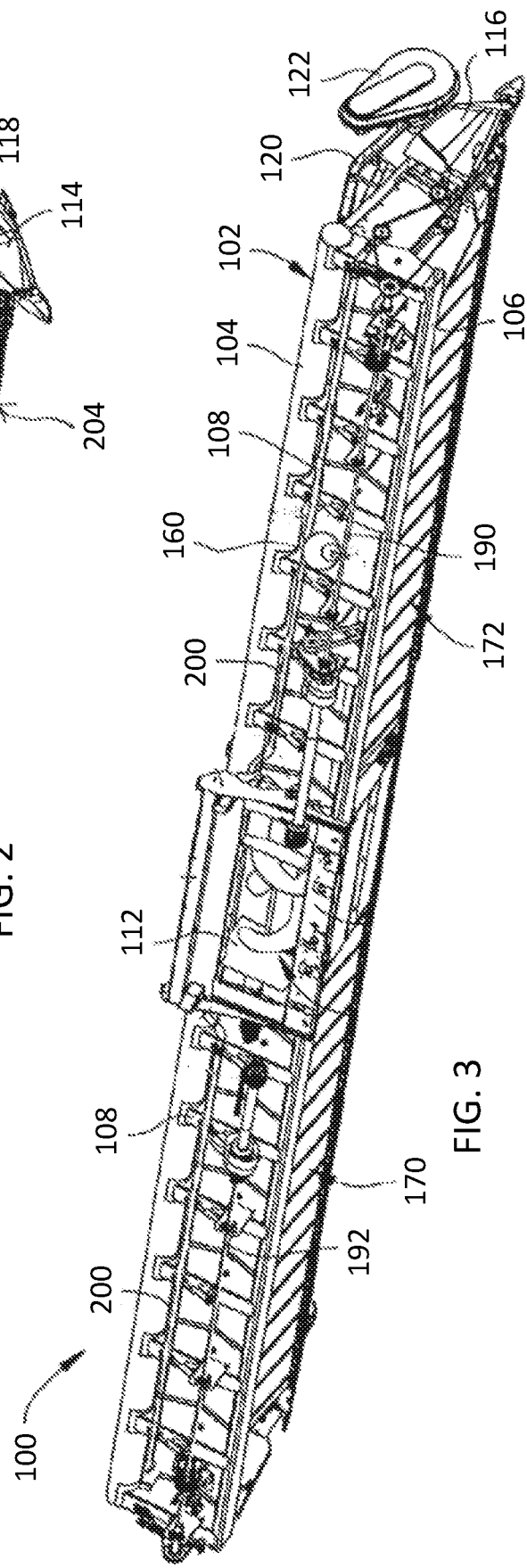

HARVESTING HEADER HAVING A HYDRAULIC FLUID LOOP AND RELATED SYSTEMS AND METHODS

CROSS-REFERENCE TO RELATED APPLICATION

This application claims the benefit of the filing date of U.S. Provisional Patent Application 62/803,895, filed Feb. 11, 2019, the entire disclosure of which is incorporated herein by reference.

FIELD

Embodiments of the present disclosure relate to hydraulic drive systems for machines. More particularly, embodiments of the present disclosure relate to hydraulic systems for driving tools typically attached to a combine harvester.

BACKGROUND

Agricultural harvesting machines, such as combine harvesters, can be complex machines with large and complex crop-processing systems. Various components of such systems may be adjusted to optimize any of various performance criteria. By way of example, combine harvesters may include one or more threshing and separating rotors, one or more concave grates associated with each of the one or more rotors, a stratification pan, a return pan and a fan for blowing air through the processing system to separate grain from chaff.

Headers for combine harvesters and other self-propelled harvesting machines typically include a cutting mechanism and feeding apparatus which are driven by a drivetrain connected to a torque source on the harvesting machine. Headers are typically carried by combine harvesters to provide crops for processing in the combine harvester. Headers may carry tools (e.g., cutters, draper, augers, etc.) operated by hydraulic fluid or mechanical input from the combine harvester.

There is a continued desire to develop simple and robust solutions for driving and controlling tools for headers.

BRIEF SUMMARY

In some embodiments, a harvesting header is configured for use with a crop-harvesting machine. The header includes a header frame structured to be coupled to the crop-harvesting machine, a hydraulic pump carried by the header frame, at least one tool carried by the header frame, a hydraulic fluid loop carried by the header frame, a fluid inlet structured to receive hydraulic fluid from the crop-harvesting machine, and a fluid outlet structured to deliver hydraulic fluid to the crop-harvesting machine. The hydraulic fluid loop is structured to circulate hydraulic fluid within the header from the hydraulic pump to the at least one tool and back to the hydraulic pump.

A method of operating a harvesting header includes providing a hydraulic fluid via a fluid inlet from a crop-harvesting machine to a hydraulic fluid loop carried by a header frame, circulating the hydraulic fluid within the header in the hydraulic fluid loop from a hydraulic pump carried by the header frame to at least one tool carried by the header frame and back to the hydraulic pump, and removing a portion of the hydraulic fluid from the hydraulic fluid loop to the crop-harvesting machine via a fluid outlet. The header frame is coupled to the crop-harvesting machine.

In some embodiments, a non-transitory computer-readable medium includes processor-executable instructions that when executed are configured to enable a computer processor to perform operations. The operations include providing a hydraulic fluid via a fluid inlet from a crop-harvesting machine to a hydraulic fluid loop carried by a header frame, circulating the hydraulic fluid within the header in the hydraulic fluid loop from a hydraulic pump carried by the header frame to at least one tool carried by the header frame and back to the hydraulic pump, and removing a portion of the hydraulic fluid from the hydraulic fluid loop to the crop-harvesting machine via a fluid outlet. The header frame is coupled to the crop-harvesting machine.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 2 is a left front perspective view of a harvesting header;

FIG. 3 is a left rear perspective view of the harvesting header shown in FIG. 2;

DETAILED DESCRIPTION

Figure 1:
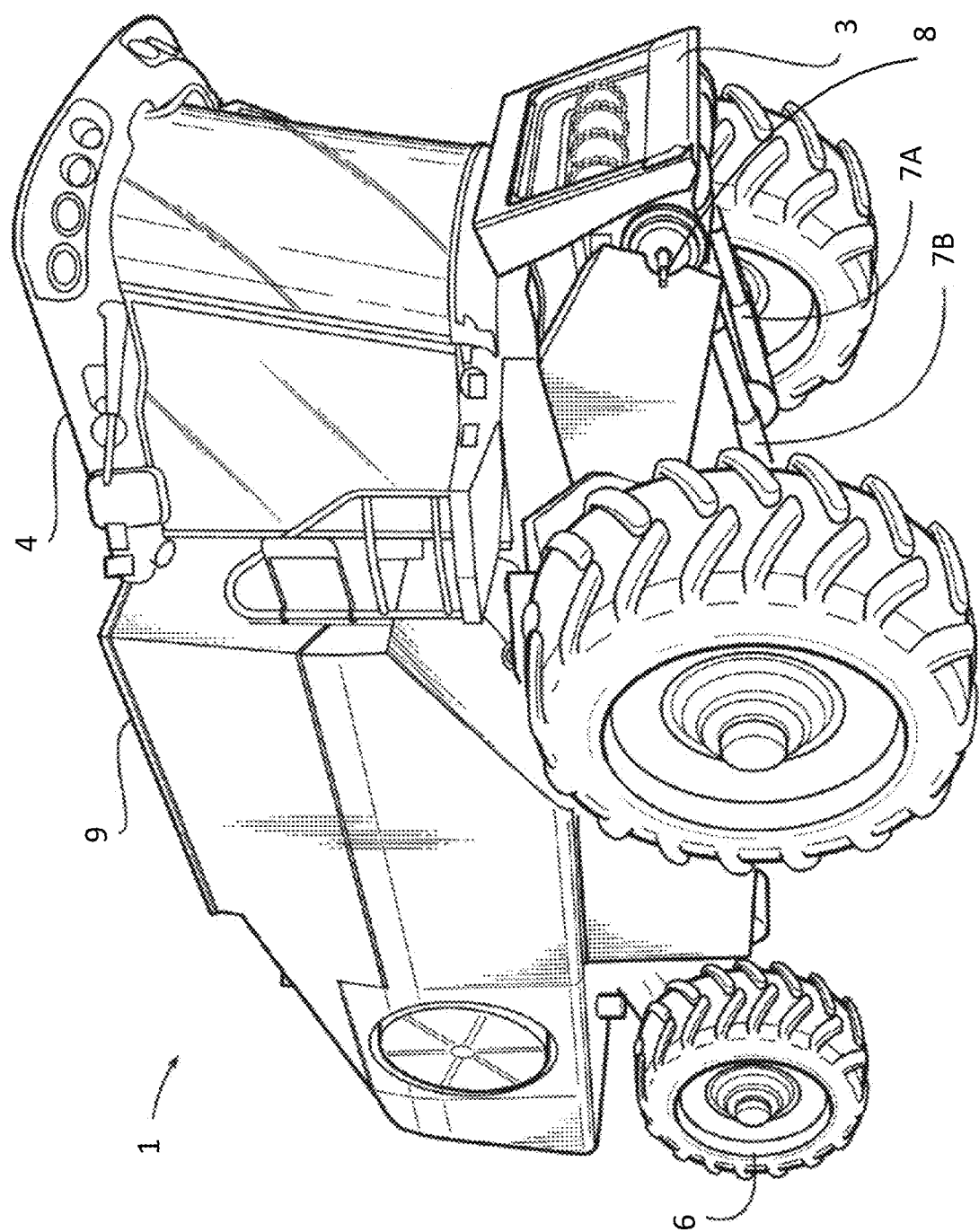
FIG. 1 is a simplified front perspective view of an example combine harvester.

The illustrations presented herein are not actual views of any particular crop harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, any drawings accompanying the application are for illustrative purposes only, and are thus not drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an example agricultural machine embodied as a combine harvester 1. In the context of the present disclosure, the example combine harvester 1 is merely illustrative, and other machines and/or implements with like functionality may deploy certain embodiments disclosed herein. The example combine harvester 1 is shown in FIG. 1 without a header attached, and includes a feeder house 3. An operator cab 4 is mounted to a chassis 5 supported by wheels 6. In some embodiments, other or additional forms of travel may be used, such as tracks. Hydraulic cylinders 7 (e.g., 7A and 7B) are shown affixed to the underside of the feeder house 3 on one end and to the chassis 5 on the other end. The feeder house 3 may move (e.g., up and down, tilt, etc.) based on actuation of the hydraulic cylinders 7, which causes a detachably coupled header to also be raised, lowered, and/or tilted. A rotating shaft 8 may be configured to provide mechanical power to a header during operation of the combine harvester 1. The rotating shaft 8 may be configured to operate at various speeds, as described in, for example, U.S. Patent Application Publication 2015/0291028, "Power Takeoff Drive System for a Vehicle," published Oct. 15, 2015, the entire disclosure of which is hereby incorporated herein by reference.

In general, the combine harvester 1 cuts crop materials (e.g., using the header), wherein the cut crop materials are delivered to the front end of the feeder house 3. Such crop materials are moved upwardly and rearwardly within and beyond the feeder house 3 (e.g., by a conveyer) until reaching a processor comprising a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 1 and another portion (e.g., grain and possibly light chaff) through a cleaning process in known manner. In the processor, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials are generally retained by the concave assemblies and the grate assemblies and are discharged out from the processor and ultimately out of the rear of the combine harvester 1. The cleaned grain that drops to the bottom of the cleaning system is delivered by a conveying mechanism that transports the grain to a well-known elevator mechanism (not shown), which conveys the grain to a grain bin 9 located at the top of the combine harvester 1. Any remaining chaff and partially or unthreshed grain is recirculated through the processor via a tailings return conveying mechanism. As combine processing is known to those having ordinary skill in the art, further discussion thereof is omitted here for brevity.

FIGS. 2 and 3 illustrate a harvesting header 100 that may be used in conjunction with the combine harvester 1 shown in FIG. 1. The header 100 has an upright header frame 102 at the rear thereof that includes an upper, transverse beam 104 extending across the entire width of header 100, and a lower, transverse beam 106 that is likewise full length and extends across the full width of header 100. A plurality of upright frame members 108 interconnect beams 104, 106 at spaced locations across the back of header 100. Upright panels 110 are secured to the front edges of members 108 to define an upright rear wall of header 100. A centrally located opening 112 between a pair of the inboard upright frame members 108 serves as a crop outlet from the header 100 to the feeder house 3 of the combine harvester 1 (FIG. 1) upon which the header 100 may be mounted. The header 100 may also include left and right end panel assemblies 114, 116.

A pair of left and right support arms 118, 120 project forward from the upper beam 104 adjacent opposite ends thereof for supporting a harvesting reel (omitted for clarity) overlying the front edge of the header 100. The harvesting reel may be adjustably shiftable fore-and-aft along the support arms 118, 120 and driven by a drive assembly 122. Harvesting headers are shown and described in more detail in U.S. Patent Application Publication 2007/0193243 A1, "Combine Harvester Draper Header Having Flexible Cutterbar," published Aug. 23, 2007, and U.S. Pat. No. 7,886,511, "Draper Head with Flexible Cutterbar Having Rigid Center Section," issued Feb. 15, 2011, the entire disclosures of each of which are hereby incorporated herein by reference.

The header frame 102 of the header 100 carries a hydraulic pump 160. The hydraulic pump 160 is operably coupled with an input drive shaft 190 that extends across the right rear portion of header 100, which drive shaft 190 may also be operably coupled with and provide operating power to, for example, a right draper assembly 172. A similar drive shaft 192 is shown extending across the left rear half of the header 100 for supplying driving power to a left draper assembly 170. The hydraulic pump 160 may be driven by the drive shaft 190 or the drive shaft 192, depending on placement of the hydraulic pump 160 and design considerations (e.g., space, power requirements, etc.). The drive shafts 190, 192 are in turn driven by the rotating shaft 8 (FIG. 1) of the combine harvester 1. Thus, the hydraulic pump 160 is structured to be driven, via the drive shaft 190 or 192, by the rotating shaft 8 of the combine harvester 1.

Figure 4:
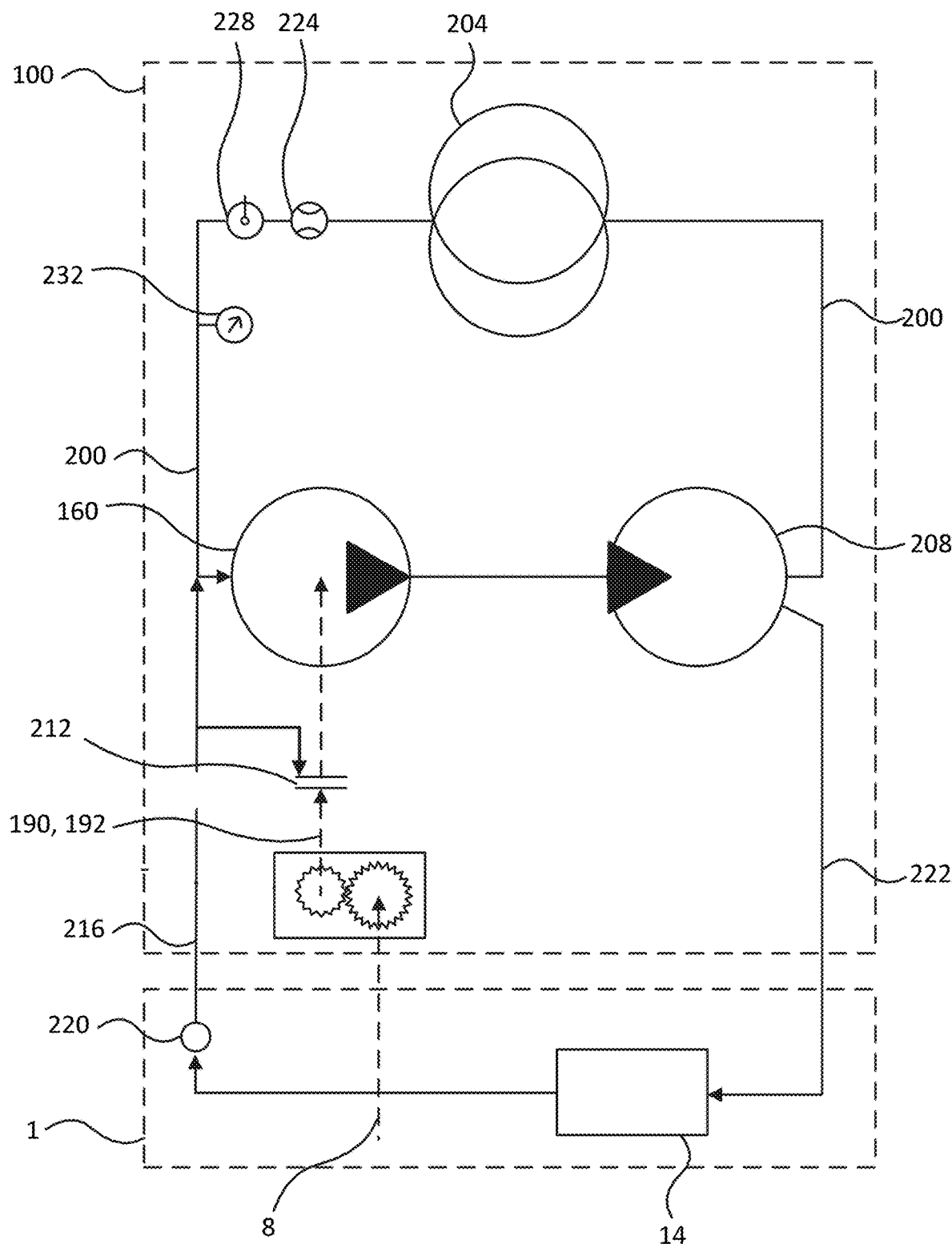
FIG. 4 is a simplified schematic diagram illustrating a hydraulic fluid loop in the header shown in FIGS. 2 and 3, and in the combine harvester shown in FIG. 1.

The hydraulic pump 160 is connected to a hydraulic fluid loop 200 (e.g., a series of hoses, pipes, fittings, etc.) carried by the header through which hydraulic fluid can circulate. A simplified schematic diagram illustrating the hydraulic fluid loop 200 is shown in FIG. 4. The hydraulic fluid loop 200 is connected to one or more motors 208 to operate one or more tools 204. For example, the tools 204 may be cutters, drapers, augers, reels, fans, side knives, air reels, etc. The hydraulic fluid loop 200 may also be connected to a motor 208 configurable to direct a portion of the hydraulic fluid to the combine harvester 1.

The hydraulic fluid loop 200 is configured to receive hydraulic fluid from the combine harvester 1. A clutch 212 coupled to the pump is configured to control operation of the hydraulic pump 160, such that the hydraulic pump 160 only operates when the pressure in the hydraulic fluid loop 200 exceeds a certain threshold.

In operation, the header 100 receives hydraulic fluid in the hydraulic fluid loop 200 from the combine harvester 1 via a fluid inlet 216. Initially, the hydraulic fluid loop 200 may be unpressurized, i.e., the pressure in the hydraulic fluid loop 200 may be approximately zero psig (0 kPa). As the combine harvester 1 begins delivering hydraulic fluid to the header 100 (e.g., responsive to opening a control valve 220 on the combine harvester 1), the pressure in the hydraulic fluid loop 200 begins to rise. Once the pressure in the hydraulic fluid loop 200 reaches a preset threshold (e.g., from about 10 psig (69 kPa) to about 30 psig (207 kPa), such as about 25 psig (172 kPa)), the clutch 212 engages the hydraulic pump 160 to the input drive shaft 190 or 192, and the hydraulic pump 160 begins to circulate hydraulic fluid from an outlet of the hydraulic pump 160, through the hydraulic fluid loop 200 to the motor 208 and the tool(s) 204, and back to an inlet of the hydraulic pump 160. The hydraulic pump 160 may increase a pressure and/or a flow rate of the hydraulic fluid in the hydraulic fluid loop 200, such that the hydraulic fluid has sufficient pressure and flow to drive the tools 204. That is, the flow rate in the hydraulic fluid loop 200 while the hydraulic pump 160 is operating may be higher than the flow rate of the hydraulic fluid from the combine harvester 1 to the header 100 through the fluid inlet 216. Thus, the use of the hydraulic pump 160 may enable the header 100 to operate tools 204 that require more hydraulic fluid flow than the combine harvester 1 can provide. A portion of the hydraulic fluid may flow through a fluid outlet 222 back to the combine harvester 1, and may be processed through a hydraulic system 14 of the combine harvester 1.

The header 100 may optionally have one or more sensors configured to detect at least one property of the hydraulic fluid in the hydraulic fluid loop. For example, a flow meter 224 may be disposed in-line with fluid flowing through the hydraulic fluid loop 200. In some embodiments, the hydraulic fluid loop 200 may be connected to a temperature sensor 228 and/or a pressure sensor 232.

The clutch 212 may limit or prevent cavitation of the hydraulic fluid in the hydraulic pump 160 in comparison to a system lacking a clutch or clutch mechanism. In particular, if the hydraulic pump 160 were to operate when the pressure in the hydraulic fluid loop 200 is low, some of the hydraulic fluid may evaporate in the hydraulic pump 160, forming vapor cavities (bubbles). The cavities may then collapse, causing stress on parts of the hydraulic pump 160. Because the clutch 212 can disengage the hydraulic pump 160 from the input drive shaft 190 or 192 until the hydraulic pressure reaches a threshold value, damage to the hydraulic pump 160 can be decreased. Thus, the header 100 may exhibit a longer life by limiting cavitation damage to the hydraulic pump 160 that occurs particularly during startup.

In some embodiments, the clutch 212 may be omitted, such as if the hydraulic pump 160 is a piston pump with electric displacement control. In such embodiments, the hydraulic pump 160 may operate with zero displacement until a preselected pressure is observed in the hydraulic fluid loop 200 (e.g., by the pressure sensor 232).

During normal operations (i.e., at times other than startup, shut-down, and other changes in operating conditions) the mass flow rate of hydraulic fluid out of the hydraulic fluid loop 200 through the fluid outlet 222 may be approximately equal to the mass flow rate of the hydraulic fluid into the hydraulic fluid loop 200 through the fluid inlet 216. Thus, the mass of fluid in the hydraulic fluid loop 200 may be approximately at steady-state. The hydraulic fluid may be cooled, filtered, or otherwise processed in the combine harvester 1, rather than in the header 100. Therefore, certain components that are required to operate a hydraulic system may be omitted from the header 100, such as a radiator and a fluid reservoir, which can save costs, weight, and complexity of the header 100. The hydraulic system 14 of the combine harvester 1 typically includes these components, which may be beneficially used to operate the header 100.

Furthermore, because the hydraulic pump 160 can increase the flow rate of the hydraulic fluid through the hydraulic fluid loop 200 compared to the flow that the combine harvester 1 can provide, the header 100 may operate tools 204 that could not be operated by conventional headers with the combine harvester 1. For example, if the combine harvester 1 is configured to deliver 12 gallons per minute (gpm) (45.4 liters per minute (lpm)) of hydraulic fluid to the header 100, the hydraulic pump 160 may pump 50 gpm (189 lpm) or more through the hydraulic fluid loop 200.

Typically, windrowers deliver higher hydraulic fluid flow rates than combine harvesters. The header 100 may include tools 204 common to windrower headers, but may nonetheless be operable by a combine harvester 1. Higher flow of hydraulic fluid than in conventional headers may also enable the use of more hydraulic tools 204 by the header 100. Hydraulic tools 204 may be preferable to mechanical-drive tools because variable speed control is simpler to implement using hydraulics.

During times when the need for hydraulic fluid flow is decreased, or when the need for cooling or filtering of the hydraulic fluid is decreased, the flow rate of the hydraulic fluid from the combine harvester 1 may also be decreased.

This may save power in the combine harvester 1 for other systems, and may enable the combine harvester 1 to operate more efficiently. Therefore, the use of the header 100 disclosed may lead to lower operating costs (e.g., fuel) as compared to conventional headers.

Figure 5:
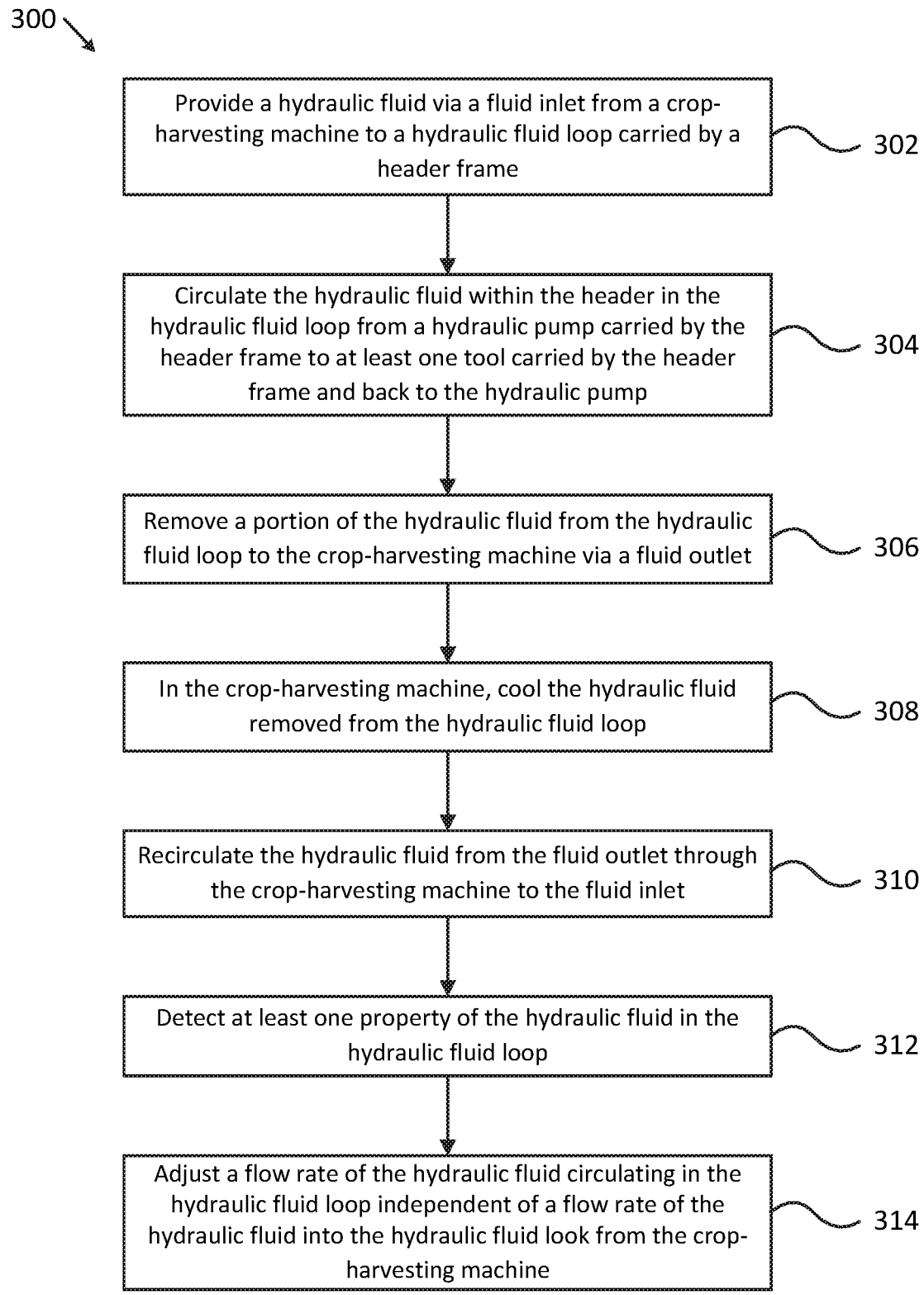
FIG. 5 is a simplified flow chart illustrating an example method of operating the header shown in FIGS. 2 and 3.

FIG. 5 is a simplified flow chart illustrating an example method 300 of operating the header 100 shown in FIGS. 2 and 3. Some operations shown in FIG. 5 are optional, and a person having ordinary skill in the art could select the order of operations to fit operational needs. The operations shown in FIG. 5 may be performed at substantially the same time, and may be performed continuously while operating the header 100. The flow chart in FIG. 5 is not intended to be limiting.

The method 300 depicted includes, as shown in element 302, providing a hydraulic fluid via a fluid inlet from a crop-harvesting machine to a hydraulic fluid loop carried by a header frame. The header frame is coupled to the crop-harvesting machine. The hydraulic fluid may be provided by withdrawing at least a portion of the hydraulic fluid from a fluid reservoir carried by the crop-harvesting machine, rather than by the header.

The method 300 includes, as shown in element 304, circulating the hydraulic fluid within the header in the hydraulic fluid loop from a hydraulic pump carried by the header frame to at least one tool carried by the header frame and back to the hydraulic pump. The hydraulic fluid may be circulated at a flow rate higher than a flow rate of the hydraulic fluid into the hydraulic fluid loop. For example, the flow rate of hydraulic fluid in the hydraulic fluid loop may be at least double, at least three times, at least five times, or even at least ten times the flow rate of the hydraulic fluid into the hydraulic fluid loop. In some embodiments, the flow rate of the hydraulic fluid in the hydraulic fluid loop may be at least 20 gpm (76 lpm), at least 40 gpm (152 lpm), or even at least 50 gpm (189 lpm).

As shown in element 306, the method 300 may include removing a portion of the hydraulic fluid from the hydraulic fluid loop to the crop-harvesting machine via a fluid outlet. Element 308 depicts in the crop-harvesting machine, cooling the hydraulic fluid removed from the hydraulic fluid loop. Element 310 depicts recirculating the hydraulic fluid from the fluid outlet through the crop-harvesting machine to the fluid inlet. Element 312 depicts detecting at least one property of the hydraulic fluid in the hydraulic fluid loop. For example, the detected property may be temperature, pressure, a rotational velocity of the hydraulic pump, etc.

Element 314 depicts adjusting a flow rate of the hydraulic fluid circulating in the hydraulic fluid loop independent of a flow rate of the hydraulic fluid into the hydraulic fluid loop from the crop-harvesting machine. For example, the flow rate of the hydraulic fluid may vary based on which tools are currently operating on the header. In some embodiments, the flow rate of hydraulic fluid into and out of the header may be varied during operation.

Figure 6:
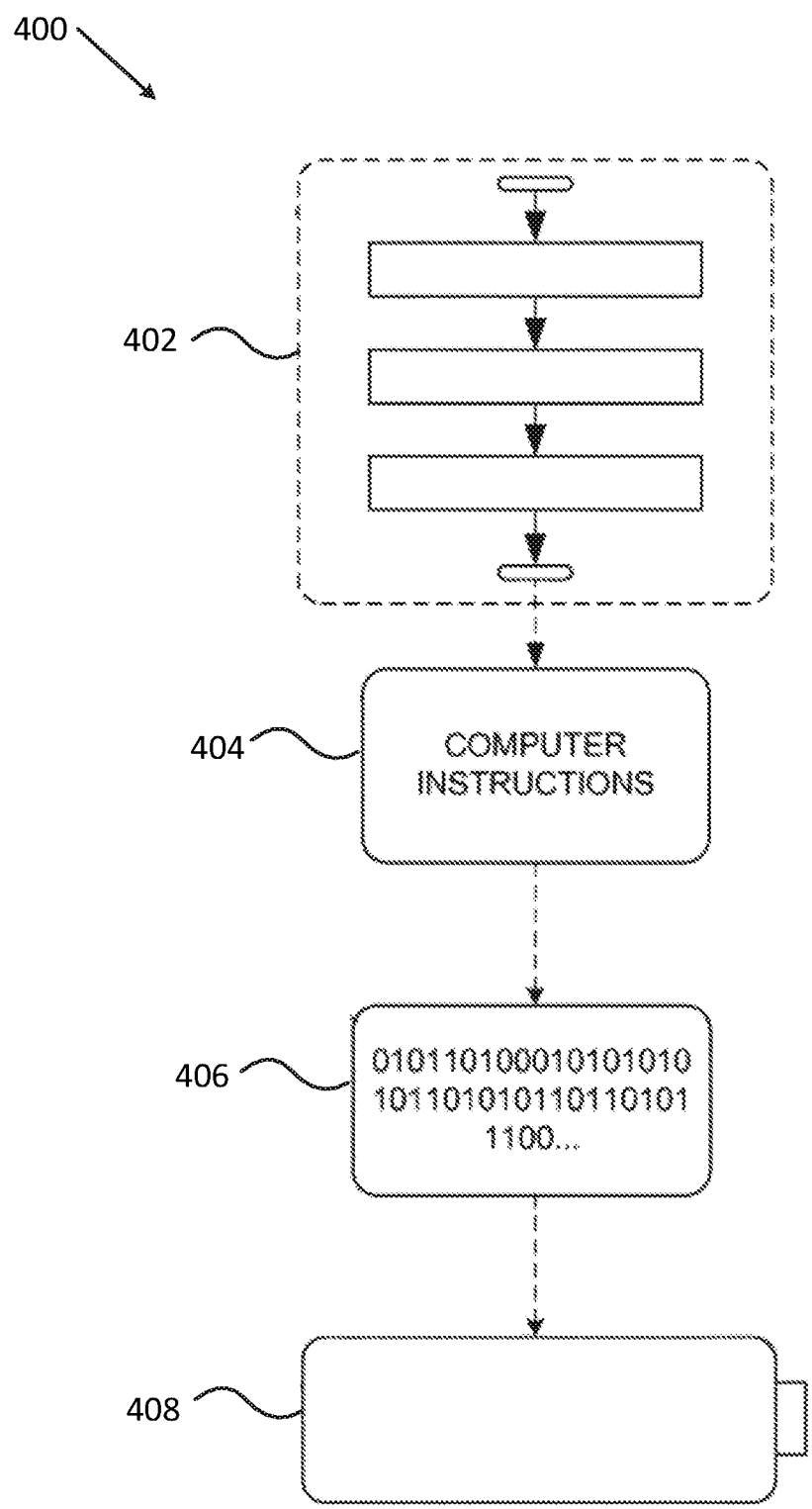
FIG. 6 is an illustration of an example computer-readable medium comprising processor-executable instructions configured to embody one or more of the methods of operating the header shown in FIGS. 2 and 3.

Still other embodiments involve a computer-readable medium having processor-executable instructions configured to implement one or more of the techniques presented herein. An example computer-readable medium that may be devised in these ways is illustrated in FIG. 6, wherein an implementation 400 includes a computer-readable medium 402 (e.g., a flash drive, CD-R, DVD-R, application-specific integrated circuit (ASIC), field-programmable gate array (FPGA), a platter of a hard disk drive, etc.), on which is encoded computer-readable data 404. This computer-readable data 404 in turn includes a set of processor-executable instructions 406 configured to operate according to one or more of the principles set forth herein. In some embodiments, the processor-executable instructions 406 may be configured to perform operations 408 when executed via a processing unit, such as at least some of the example method 300 depicted in FIG. 5. In other embodiments, the processor-executable instructions 406 may be configured to implement a system, such as at least some of the example combine harvester 1 of FIG. 1 or the example harvesting header 100 of FIGS. 2 and 3. Many such computer-readable media may be devised by those of ordinary skill in the art that are configured to operate in accordance with one or more of the techniques presented herein.

For example, the computer-readable medium 402 may be configured to enable the computer processor to change a rotational velocity of the hydraulic pump 160 (FIGS. 3 and 4), such as in response to a property of the hydraulic fluid in the hydraulic fluid loop 200 as detected by the sensor(s) 224, 228, 232. The computer-readable medium 402 may be configured to enable the computer processor to control a ratio of a flow rate of the hydraulic fluid in the hydraulic fluid loop 200 to a flow rate of the hydraulic fluid leaving the hydraulic fluid loop via the fluid outlet 222.

Additional non-limiting example embodiments of the disclosure are described below.

Embodiment 1: A harvesting header for use with a crop-harvesting machine comprising a header frame structured to be coupled to a crop-harvesting machine, a hydraulic pump carried by the header frame, at least one tool carried by the header frame, a hydraulic fluid loop carried by the header frame and structured to circulate hydraulic fluid within the header from the hydraulic pump to the at least one tool and back to the hydraulic pump, a fluid inlet structured to receive hydraulic fluid from the crop-harvesting machine, and a fluid outlet structured to deliver hydraulic fluid to the crop-harvesting machine.

Embodiment 2: The harvesting header of Embodiment 1, further comprising a clutch structured to engage the hydraulic pump when a pressure in the hydraulic fluid loop exceeds a threshold pressure.

Embodiment 3: The harvesting header of Embodiment 1 or Embodiment 2, wherein the hydraulic pump is structured to be driven by a mechanical input shaft carried by the header frame and coupled to the crop-harvesting machine.

Embodiment 4: The harvesting header of any of Embodiment 1 through Embodiment 3, further comprising a sensor configured to detect at least one property of the hydraulic fluid in the hydraulic fluid loop.

Embodiment 5: The harvesting header of Embodiment 4, wherein the sensor comprises a sensor selected from the group consisting of a temperature sensor and a pressure sensor.

Embodiment 6: A method of operating a harvesting header comprising providing a hydraulic fluid via a fluid inlet from a crop-harvesting machine to a hydraulic fluid loop carried by a header frame, circulating the hydraulic fluid within the header in the hydraulic fluid loop from a hydraulic pump carried by the header frame to at least one tool carried by the header frame and back to the hydraulic pump, and removing a portion of the hydraulic fluid from the hydraulic fluid loop to the crop-harvesting machine via a fluid outlet. The header frame is coupled to the crop-harvesting machine.

Embodiment 7: The method of Embodiment 6, wherein circulating the hydraulic fluid in the hydraulic fluid loop comprises circulating the hydraulic fluid in the hydraulic fluid loop at a flow rate higher than a flow rate of the hydraulic fluid into the hydraulic fluid loop.

Embodiment 8: The method of Embodiment 6 or Embodiment 7, wherein circulating the hydraulic fluid in the hydraulic fluid loop comprises circulating the hydraulic fluid in the hydraulic fluid loop at a flow rate a least double a flow rate of the hydraulic fluid into the hydraulic fluid loop.

Embodiment 9: The method of any of Embodiment 6 through Embodiment 8, wherein circulating the hydraulic fluid in the hydraulic fluid loop comprises circulating the hydraulic fluid in the hydraulic fluid loop at a flow rate of at least 189 liters per minute.

Embodiment 10: The method of any of Embodiment 6 through Embodiment 9, further comprising in the crop-harvesting machine, cooling the hydraulic fluid removed from the hydraulic fluid loop.

Embodiment 11: The method of any of Embodiment 6 through Embodiment 10, further comprising recirculating the hydraulic fluid from the fluid outlet through the crop-harvesting machine to the fluid inlet.

Embodiment 12: The method of any of Embodiment 6 through Embodiment 11, wherein providing a hydraulic fluid via a fluid inlet from a crop-harvesting machine to a hydraulic fluid loop comprises withdrawing at least a portion of the hydraulic fluid from a fluid reservoir carried by the crop-harvesting machine.

Embodiment 13: The method of any of Embodiment 6 through Embodiment 12, further comprising detecting at least one property of the hydraulic fluid in the hydraulic fluid loop.

Embodiment 14: The method of Embodiment 13, wherein detecting at least one property of the hydraulic fluid comprises detecting a property selected from the group consisting of temperature and pressure.

Embodiment 15: The method of any of Embodiment 6 through Embodiment 14, further comprising detecting a rotational velocity of the hydraulic pump.

Embodiment 16: The method of any of Embodiment 6 through Embodiment 15, further comprising adjusting a flow rate of the hydraulic fluid circulating in the hydraulic fluid loop independent of a flow rate of the hydraulic fluid into the hydraulic fluid loop from the crop-harvesting machine.

Embodiment 17: A non-transitory computer-readable medium comprising processor-executable instructions that when executed are configured to enable a computer processor to perform operations. The operations comprise providing a hydraulic fluid via a fluid inlet from a crop-harvesting machine to a hydraulic fluid loop carried by a header frame, circulating the hydraulic fluid within the header in the hydraulic fluid loop from a hydraulic pump carried by the header frame to at least one tool carried by the header frame and back to the hydraulic pump, and removing a portion of the hydraulic fluid from the hydraulic fluid loop to the crop-harvesting machine via a fluid outlet. The header frame is coupled to the crop-harvesting machine.

Embodiment 18: The non-transitory computer-readable medium of Embodiment 17, wherein the processor-executable instructions are further configured to enable the computer processor to change a rotational velocity of the hydraulic pump.

Embodiment 19: The non-transitory computer-readable medium of Embodiment 18, wherein the processor-executable instructions are further configured to enable the computer processor to change the rotational velocity of the hydraulic pump responsive to a detected property of the hydraulic fluid in the hydraulic fluid loop.

Embodiment 20: The non-transitory computer-readable medium of Embodiment 19, wherein the processor-executable instructions are further configured to enable the computer processor to control a ratio of a flow rate of the hydraulic fluid in the hydraulic fluid loop to a flow rate of the hydraulic fluid leaving the hydraulic fluid loop via the fluid outlet.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various header types and configurations.

What is claimed is:

1. A harvesting header for use with a crop-harvesting machine, the harvesting header comprising:
   a header frame structured to be coupled to the crop-harvesting machine;
   a hydraulic pump carried by the header frame, wherein the hydraulic pump is structured to be driven by a mechanical input shaft carried by the header frame and coupled to the crop-harvesting machine;
   a hydraulic motor carried by the header frame;
   at least one tool carried by the header frame;
   a hydraulic fluid loop carried by the header frame and structured to circulate hydraulic fluid within the harvesting header from the hydraulic pump to the hydraulic motor, the hydraulic fluid comprising a first portion and a second portion, wherein the first portion is provided to the at least one tool and back to the hydraulic pump;
   a fluid outlet positioned at an output of the hydraulic motor and structured to deliver the second portion of the hydraulic fluid through the fluid outlet to the crop-harvesting machine;
   a fluid inlet positioned at an input of the hydraulic pump and structured to receive hydraulic fluid from the crop-harvesting machine; and
   a clutch structured to engage the hydraulic pump when a pressure in the hydraulic fluid loop exceeds a threshold pressure.

2. The harvesting header of claim 1, further comprising a sensor configured to detect at least one property of the hydraulic fluid in the hydraulic fluid loop.

3. The harvesting header of claim 2, wherein the sensor comprises a sensor selected from the group consisting of a temperature sensor and a pressure sensor.

4. A crop harvesting machine comprising a combine hydraulic system and the harvesting header of claim 1.

5. The crop harvesting machine of claim 4 wherein the hydraulic pump maintains a loop hydraulic pressure in the hydraulic fluid loop that is greater than a pressure maintained in the combine hydraulic system.

6. The crop harvesting machine of claim 4 wherein the hydraulic pump maintains a loop hydraulic flow rate of the first portion of the hydraulic fluid through the hydraulic fluid loop that is greater than a flow rate of hydraulic fluid received at the fluid inlet from the combine hydraulic system.

7. A method of operating a harvesting header, the method comprising:

providing a hydraulic fluid via a fluid inlet from a crop-harvesting machine to a hydraulic fluid loop carried by a header frame, wherein the header frame is coupled to the crop-harvesting machine;

engage a hydraulic pump in the hydraulic fluid loop, where the hydraulic pump has a clutch structured to engage the hydraulic pump when a pressure in the hydraulic fluid loop exceeds a threshold pressure;

circulating the hydraulic fluid within the harvesting header in the hydraulic fluid loop from a hydraulic pump carried by the header frame such that a first portion of the hydraulic fluid is provided to at least one tool carried by the header frame and back to the hydraulic pump, wherein circulating the hydraulic fluid in the hydraulic fluid loop comprises circulating the first portion of the hydraulic fluid in the hydraulic fluid loop at a flow rate higher than a flow rate of the hydraulic fluid into the hydraulic fluid loop via the fluid input; and removing a second portion of the hydraulic fluid from the hydraulic fluid loop to the crop-harvesting machine via a fluid outlet.

8. The method of claim 7, wherein circulating the hydraulic fluid in the hydraulic fluid loop comprises circulating the hydraulic fluid in the hydraulic fluid loop at a flow rate a least double a flow rate of the hydraulic fluid into the hydraulic fluid loop.

9. The method of claim 7, wherein circulating the hydraulic fluid in the hydraulic fluid loop comprises circulating the hydraulic fluid in the hydraulic fluid loop at a flow rate of at least 189 liters per minute.

10. The method of claim 7, further comprising:
in the crop-harvesting machine, cooling the hydraulic fluid removed from the hydraulic fluid loop.

11. The method of claim 7, further comprising recirculating the second portion of the hydraulic fluid from the fluid outlet through the crop-harvesting machine to the fluid inlet.

12. The method of claim 7, further comprising detecting at least one property of the hydraulic fluid in the hydraulic fluid loop.

13. The method of claim 12, wherein detecting at least one property of the hydraulic fluid comprises detecting a property selected from the group consisting of temperature and pressure.

14. The method of claim 7, further comprising detecting a rotational velocity of the hydraulic pump.

15. The method of claim 7, further comprising adjusting a flow rate of the hydraulic fluid circulating in the hydraulic fluid loop independent of a flow rate of the hydraulic fluid into the hydraulic fluid loop from the crop-harvesting machine.

16. A non-transitory computer-readable medium comprising processor-executable instructions that when executed are configured to enable a computer processor to perform operations, the operations comprising:

providing a hydraulic fluid via a fluid inlet from a crop-harvesting machine to a hydraulic fluid loop carried by a header frame, wherein the header frame is coupled to the crop-harvesting machine;

engage a hydraulic pump in the hydraulic fluid loop, where the hydraulic pump has a clutch structured to engage the hydraulic pump when a pressure in the hydraulic fluid loop exceeds a threshold pressure;

circulating the hydraulic fluid within the header frame in the hydraulic fluid loop from a hydraulic pump carried by the header frame such that a first portion of the hydraulic fluid is provided to at least one tool carried by the header frame and back to the hydraulic pump, wherein circulating the hydraulic fluid in the hydraulic fluid loop comprises circulating the first portion of the hydraulic fluid in the hydraulic fluid loop at a flow rate higher than a flow rate of the hydraulic fluid into the hydraulic fluid loop via the fluid input; and removing a second portion of the hydraulic fluid from the hydraulic fluid loop to the crop-harvesting machine via a fluid outlet.

17. The non-transitory computer-readable medium of claim 16, wherein the processor-executable instructions are further configured to enable the computer processor to change a rotational velocity of the hydraulic pump.

18. The non-transitory computer-readable medium of claim 17, wherein the processor-executable instructions are further configured to enable the computer processor to change the rotational velocity of the hydraulic pump responsive to a detected property of the hydraulic fluid in the hydraulic fluid loop.

19. The non-transitory computer-readable medium of claim 18, wherein the processor-executable instructions are further configured to enable the computer processor to control a ratio of a flow rate of the hydraulic fluid in the hydraulic fluid loop to a flow rate of the hydraulic fluid leaving the hydraulic fluid loop via the fluid outlet.

* * * * *